United States Patent [19]

Kusumgar et al.

[11] Patent Number: 4,665,126

[45] Date of Patent: May 12, 1987

[54] ACETAL POLYMER COMPOSITIONS HAVING IMPROVED IMPACT STRENGTH

[75] Inventors: Rajal M. Kusumgar, Livingston; Carl A. Amond, Berkeley Heights, both of N.J.

[73] Assignee: Celanese Corporation, New York, N.Y.

[21] Appl. No.: 765,014

[22] Filed: Aug. 9, 1985

[51] Int. Cl.[4] ...................... C08L 51/02; C08L 59/00; C08L 75/04
[52] U.S. Cl. ......................................... 525/66; 525/63
[58] Field of Search .................. 525/66, 63, 399, 302, 525/308

[56] References Cited

U.S. PATENT DOCUMENTS 4,179,479  12/1979  Carter, Jr. .............................. 525/66

FOREIGN PATENT DOCUMENTS 0116456  8/1984  European Pat. Off. .
0117664  8/1984  European Pat. Off. .
1964156  6/1971  Fed. Rep. of Germany ........ 525/66
57-14641  1/1982  Japan ..................................... 525/66

Primary Examiner—Allan M. Lieberman
Attorney, Agent, or Firm—Marvin Turken

[57] ABSTRACT

The invention relates to acetal polymer molding compositions having improved impact strength and containing lower amounts than the acetal polymer of a thermoplastic polyurethane, e.g. a polyether- or polyester-based polyurethane, and a multiphase composite interpolymer, e.g. comprising an elastomeric acrylic phase onto which is grafted a rigid thermoplastic polymeric phase. The composition is preferably blended at a shear rate of less than about 5000 sec$^{-1}$.

13 Claims, No Drawings

ACETAL POLYMER COMPOSITIONS HAVING IMPROVED IMPACT STRENGTH

FIELD OF THE INVENTION

This invention relates to acetal polymer compositions having improved impact strength.

BACKGROUND OF THE INVENTION

Molding compositions comprising acetal polymers have been in commercial use for many years. They have application in a wide variety of end uses e.g., automobile applications such as bumper extensions and instrument panels, plumbing supplies such as valves, shower assemblies, flush tank components, faucets and pipe fittings, tool components such as screw driver adaptors, and household and personal products, such as quick boiling electric water kettles, clothes hangers and combs.

Acetal polymers have a highly favorable spectrum of physical properties which are responsible for their wide commercial acceptance. However for certain molding applications, e.g., exterior automobile body parts, molding compositions that impart higher than usual impact strength to articles molded from them are highly desirable.

Application Ser. No. 625,954, filed June 29, 1984, by Drzal et al. and now abandoned, the entire disclosure of which is incorporated by reference, discloses molding compositions having improved impact strength comprising a blend of an acetal polymer with any of certain elastomeric polyurethanes. In particular, the application discloses compositions having improved impact strength at low temperatures, i.e., as low as −20° F. or lower.

U.S. Pat. No. 4,096,202, of Farnham et al., the entire disclosure of which is incorporated by reference, discloses the enhancement of the impact strength of poly(alkylene terephthalates) by blending with a multiphase composite interpolymer.

U.S. Pat. No. 4,179,479 of Carter, the entire disclosure of which is incorporated by reference, discloses polymer blends of 40 to 99% of a thermoplastic polyurethane, 1 to 60% of a thermoplastic polymer which can be a polyoxymethylene, and 0.5 to 10% of an acrylic polymer as a processing aid. The blend is stated to provide a more homogeneous melt and enhanced hot metal release and lubricity.

Although the described polymeric additives for the improvement of the impact strength of acetal polymers are generally beneficial, any means for obtaining an even greater enhancement of impact strength than can be obtained by the conventional use of the additives would be highly desirable. This applies particularly to any improvement in impact strength which can be obtained without increasing the total amount of additive blended with the acetal polymer.

SUMMARY OF THE INVENTION

In accordance with this invention, the impact strength of an acetal polymer is improved by blending it with lower amounts than the acetal polymer of a thermoplastic polyurethane and a multiphase composite interpolymer, preferably comprising a cross-linked elastomeric acrylic first phase and grafted thereon a polymeric rigid thermoplastic final phase. It has been found that the resulting compositions surprisingly have much better impact strength than the acetal polymer containing an amount of either the multiphase composite interpolymer or the thermoplastic polyurethane equal to the sum of the weights of the two additives in the inventive compositions.

The acetal polymer may be an oxymethylene homopolymer, e.g. a homopolymer or formaldehyde or a compound which acts as a souce of formaldehyde, e.g. trioxane, the hemiformal groups of which have been endcapped by acylation or etherification as disclosed, for example in U.S. Pat. No. 3,170,896. Preferably, however, the acetal polymer is an oxymethylene copolymer prepared by copolymerizing a souce of formaldehyde, e.g. acyclic formaldehyde polymer such as trioxane, with 0.1 to 15 mole percent of a cyclic ether having at least two adjacent carbon atoms. Copolymers of this type are described in U.S. Pat. No. 3,027,352 of Walling et al. Such copolymers may be described as having at least one chain containing between about 85 and about 99.9 mole percent oxymethylene ($-OCH_2$) units interspersed with between about 0.4 and 15 mole percent of $-O-R-$ units wherein R is a divalent radical containing at least two carbon atoms directly linked to each other and positioned in the chain between the two valences with any substituent in the R radical being inert. The preferred copolymers are those made up of oxymethylene and oxyethylene groups, such as copolymers of trioxane with dioxolane or with ethylene oxide.

Also contemplated as the acetal polymer are terpolymers prepared, for example, by reacting a compound which acts as a source of formaldehyde, e.g. trioxane and a cyclic ether and/or cyclic acetal such as is used in the preparation of the oxymethylene copolymer, with a third monomer which is a bifunctional compound such as ethylene diglycide, diglycidyl ether and diethers of 2 mols of glycide and 1 mol of formaldehyde, dioxane or trioxane, or diethers of 2 mols of glycide and 1 mole of an aliphatic diol with 2 to 8 carbon atoms, advantageously 2 to 4 carbon atoms, or a cycloaliphatic diol with 4 to 8 cabon atoms.

Examples of suitable bifunctional compounds include the diglycidyl ethers of ethylene glycol, 1,4-butane-diol, 1,3-butane-diol, cyclobutane-1,3-diol, 1,2-propane-diol, cyclohexane-1, 4-diol and 2-dimethyl-4-dimethyl-cyclobutane-1,3-diol, with butanediol diglycidyl ethers being most preferred. The bifunctional compound may be used, for example, in the range of 0.1 to 10 percent based on the weight of the total monomers. The terpolymers may be prepared using the same methods known in the art for preparing the copolymers, including the variations for terpolymers disclosed, for example in previously cited application Ser. No. 625,954.

When an oxymethylene copolymer is empolyed containing carbon-to-carbon bonds in the polymer chain, the polymer may be prestabilized by subjecting it to a melt hydrolysis as disclosed in U.S. Pat. Nos. 3,318,848 of Clark and 3,418,280 of Ogden or solution hydrolysis as disclosed in U.S. Pat. Nos. 3,174,948 and 3,219,623.

Various other additives may also be included in the acetal polymer compositions for different purposes as well known in the art, including bisphenol-type, ester-type or hindered phenol-type additives and anti-oxidants as disclosed, for example, in U.S. Pat. Nos. 3,103,499 and 3,240,753, amidine stabilizers which probably act as acid/formaldyhyde scavengers as disclosed, for example, in U.S. Pat. Nos. 3,313,767 and 3,314,918, nucleants, UV screens and absorbers, polyamides, metal soaps, reinforcers and fillers such as glass, talc, white mica and gold mica, polymeric substances other than those critical to this invention such as ethylene vinyl acetate (EVA) polymers, and color pigments which are compatible with acetal polymers, e.g. red pigments such as azo dye and cadmium sulfide-cadmium selenide reds and "Mercadium" reds, blue pigments such as phthalocyanine blues, green pigments such as chromium oxide greens, white pigments such as titanium dioxide whites, and black pigments such as carbon blacks.

The thermoplastic polyurethane may be any of those used and generally known in the art.

Suitable thermoplastic polyurethanes useful in the invention are those prepared from a diisocyanate, a polyester or polyether and a chain extender. These thermoplastic polyurethanes are those which are substantially linear and maintain thermoplastic processing characteristics.

A preferred group of polyether-based polyurethanes used in the molding composition of the present invention are the reaction products of:

(i) 4,4'-methylenebis(phenyl isocyanate),
(ii) polyoxytetramethylene glycol having a molecular weight within the range of about 1500 to about 3000, and
(iii) a diol extender selected from the group consisting of aliphatic straight chain diols having from 2 to about 6 carbon atoms, bis(2-hydroxy-ethyl) ether of hydroquinone, bis(2-hydroxy-ethyl) ether of resorcinol, and mixtures of any two or more of such diol extenders.

This class of polyether-based polyurethanes is disclosed in previously cited application Ser. No. 625,954.

Preferably, the polyoxytetramethylene glycol has a molecular weight within the range of about 2000 to about 2900. The molecular weight of the polyoxytetramethylene glycol as used herein is a number average molecular weight. In addition to using polyoxytetramethylene glycols within the specified molecular weight ranges, it is also within the scope of the present invention to blend lower or higher molecular weight polyoxytetramethylene glycols with other molecular weight polyoxytetramethylene glycols so that the molecular weight of the final blend is within the above specified molecular weight ranges.

The term "aliphatic straight chain diols having from 2 to about 6 carbon atoms" means diols of the formula $HO(CH_2)_nOH$ wherein n is 2 to about 6 and there is no branching in the aliphatic chain separating the OH groups. The term is inclusive of ethylene glycol, 1,3-propanediol, 1,4-butanediol, 1,5-pentanediol and 1,6-hexanediol.

The preferred diol extenders are 1,4-butanediol, 1,6-hexanediol and the bis(2-hydroxy-ethyl) ether of hydroquinone; the most preferred diol extender being 1,4-butanediol.

The polyoxytetramethylene glycol and diol extender are used in the polyurethane reaction medium in a ratio of about 0.5 to about 2.5 equivalents (e.g., mole equivalents) of the diol extender per equivalent of the glycol. Preferably, the equivalents ratio is from about 1 to about 2. Most preferably the ratio is from about 1.2 to about 1.6 equivalents of diol extender per equivalent of the glycol when the polyoxytetramethylene glycol has a molecular weight of about 2000, and especially when the dio extender is an aliphatic straight chain diol. When the hydroquinone or resorcinol extender are used, the equivalents ratio may be lower than the above-mentioned preferred ranges, for example, as low as about 0.5 equivalents of the extender per equivalent of the glycol.

Regardless of the particular reaction method which is chosen in preparing the foregoing polyether-based polyurethanes the hydroxyl components (i.e., the polyoxytetramethylene glycol and the diol extender) and the diisocyanate are used such that the overall ratio of isocyanate equivalents or groups to total hydroxyl equivalents or groups (glycol plus diol extender) is within the range of about 1:1 to about 1.08:1.0, and preferably is within the range of about 1.02:1.0 to about 1.07:1.0. The most preferred ratio of isocyanate (NCO) groups to total hydroxyl (OH) groups is within the range of from about 1.03:1.0 to about 1.06:1.0.

The term equivalent(s) as used with respect to the polyurethane preparation in the present specification and claims is based on the hydroxyl and isocyanate groups of the reactants.

An especially preferred polyether-based, thermoplastic polyurethane for use in the acetal polymer molding compositions of the present invention is prepared by reacting 1.0 equivalent of polyoxytetramethylene glycol having a molecular weight of about 2000 with 1.5 equivalents of 1,4-butanediol and 2.63 equivalents of 4,4'-methylenebis(phenyl isocyanate). This polyurethane is sold by Upjohn Company under the trademark "Pellethane X0157-75A" when admixed with 0.25 percent by weight of N,N'-ethylene bisstearmide (lubricant) sold under the trademark "Advawax 280," by Cincinnati Milacron Chemicals, Inc., and 0.25 percent by weight tetrakis[methylene 3-(3',5'-di-tert-butyl-r'-hydroxyphenyl)propionate]methane (antioxidant) sold under the trademark "Irganox 1010," by Ciba-Geigy Corp. The weight percent of the additives are based on the total weight of the polyurethane reactants.

The polyether-based polyurethanes contemplated for use in the present invention can be prepared by processes which are conventional in the art of the synthesis of thermoplastic polyurethanes. Illustrative of such processes are those described in U.S. Pat. Nos. 3,493,634; 4,169,196; 4,202,957; and 3,642,964. Such processes include the one-shot procedure in which all the reactants are brought together simultaneously, and the prepolymer procedure in which the isocyanate is reacted with the polyoxytetramethylene glycol in a first-step and the isocyanate terminated prepolymer so produced is subsequently reacted with the diol extender. The one-shot process also includes the process in which the diisocyanate has been converted to a quasi-prepolymer by reaction with a very minor amount (i.e., less than about 10 percent on an equivalent basis) of the glycol prior to carrying out the polyurethane forming reaction. The one-shot is the preferred procedure for preparing the thermoplastic polyether-based polyurethanes of the present invention. In a most preferred embodiment, the polyurethanes are prepared by a continuous one-shot procedure such as the one set forth in U.S. Pat. No. 3,642,964.

In the one-shot procedures (including continuous one-shot procedure) the reactants are brought together in any order. Advantageously, the polyoxytetramethylene glycol and the diol extender are preblended and fed to the reaction zone as a single component, the other major component being the diisocyanate (or quasi-prepolymer were used). The mixing and reaction of the reactants can be accomplished by any of the procedures and apparatus conventional in the art. Preferably, the individual components or reactants are rendered substantially free from the presence of extraneous moisture using conventional procedures, for example, by azeotropic distillation using benzene, toluene, and the like, or by heating under reduced pressure at a temperature above the boiling point of water at the pressure employed. As is well known by those skilled in the art, water will interfere with the polyurethane reacting with the diisocyanate and the resulting polyurethane. Thus, moisture levels as low as practical are desired, typically well below 0.1 percent by weight of the total reactants, and more preferably below 0.05 weight percent and even lower.

Advantageously, in a one-shot batch procedure, the heated hydroxyl components either alone or preferably together, are subjected to degassing in order to remove residual moisture, entrained bubbles of air or other gases before the polyurethane reaction takes place. This degassing is accomplished conveniently by reducing the pressure under which the components are maintained until no further evolution of bubbles occurs. Typically, such degassing takes from about 1 to about 3 hours at about 85° C. to about 110° C. The hydroxyl components are preferably stirred during degassing. The degassed hydroxyl components are then admixed with the diisocyanate (or quasi-prepolymer where used), which is typically at about 60° C. The resulting degassed mixture is then reacted, with stirring, to form the thermoplastic polyurethane. The polyurethane reaction is exothermic. Reaction temperatures typically range from about 80° C. to about 200° C. or higher.

The resulting polyurethane is then transferred to suitable molds or extrusion equipment or the like and cured at a temperature on the order of about 20° C. to about 115° C. The time required for curing will vary with the temperature of curing and also with the nature of the particular composition. The time required in any given case can be determined by a process of trial and error. Typically, the polyether-based polyurethanes of the present invention may be cured at about 100° C. for about 1 hour and at about 20° C. to about 23° C. for 24 hours when a one-shot batch procedure is used.

It is frequently desirable but not essential to include a catalyst in the reaction mixture employed to prepare the polyurethane compositions of the present invention. Any of the catalysts conventionally employed in the art to catalyze the reaction of an isocyanate with a reactive hydrogen containing compound can be employed for this purpose; see, for example, Saunders et al, Polyurethanes, Chemistry and Technology, Part 1, Interscience, New York, 1963, pages 228-232; see also Britain et al., J. Applied Polymer Science, 4, 207-211, 1960. Such catalysts include organic and inorganic acid salts of, and organometallic derivatives of, bismuth, lead, tin, iron antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethyl-ethylenediamine, N,N,N',N'-tetraethylenediamine, N-methyl-morpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.002 to about 2.0 percent by weight based on the total weight of the polyurethane reactants.

When the polyether-based thermoplastic polyurethane is prepared by the less preferred prepolymer method, the diisocyanate and the polyoxytetramethylene glycol (in whole or in part) are reacted, if desired, in the presence of a catalyst as defined above, in a preliminary stage to form an isocyanate-terminated prepolymer. The proportions of diisocyanate and glycol employed in the preparation of this prepolymer are consistent with the ranges defined above. The diisocyanate and the glycol are preferably rendered substantially free from the presence of extraneous moisture, using the methods described above, before the formation of the prepolymer is carried out. The formation of the prepolymer is advantageously carried out at a temperature within the range of about 70° C. to about 130° C. under an inert atmosphere such as nitrogen gas in accordance with conventional procedures. The prepolymer so formed can then be reacted at any desired time, with the extender diol (and the balance, if any, of polyoxytetramethylene glycol not reacted with the diisocyanate in the first stage) to form the polyurethane elastomers of the present invention. This reaction is carried out advantageously with the range of reaction temperatures specified above for the one-shot procedure. In general, the prepolymer and the diol extender (preferably degassed as described above) are mixed and heated within the requisite temperature range and then transferred to suitable molds, extrusion apparatus, or the like, and cured as described above for the one-shot procedure.

The polyether-based thermoplastic used in polyurethanes present invention are characterized by a Clash-Berg modulus ($T_f$) which is less than about $-40°$ C. and preferably a $T_f$ of less than about $-60°$ C. The Tg (glass transition temperature) of the polyurethanes is essentially the same value. The polyether-based polyurethanes may suitably have, for example, a Shore A Hardness of 95A or less, and a weight average molecular weight in excess of 100,000.

A preferred group of thermoplastic polyester-based polyurethanes for use in the present invention are the reaction products of:
 (i) 4,4'-methylenebis(phenyl isosyanate;
 (ii) a polyester of adipic acid and a glycol having at least one primary hydroxyl group; and
 (iii) a diol chain extender.

The foregoing class of polyester-based polyurethanes is disclosed for example in U.S. Pat. No. 4,179,479, the entire disclosure of which is incorporated by reference.

In preparing the polyester precursor of this group of polyurethanes the adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02% preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1% may be used along with the glycols such as, for example, trimethylolpropane, glycerine, hexanetriol and the like. The resulting hydroxyl polyester has a molecular weight of at least about 600, a hydroxyl number of about 25 to about 190 and preferably between about 40 and about 60, and an acid number of between about 0.5 and about 2 and a water content of 0.01 to about 0.2%.

Any suitable diol chain extending agent having active hydrogen containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-bis-$\beta$-hydroxy ethyl ether, 1,3-phenylene-bis-$\beta$-hydroxy ethyl ether, bis-(hydroxy-methyl-cyclohexane), hexanediol, thiodiglycol and the like.

The thermoplastic polyester-based polyurethanes contemplated for use in this invention may be prepared by any of the methods disclosed, for example, in U.S. Pat. Nos. 3,214,411 and 4,179,479. In one type of procedure the polyester, diisocyanate and chain extender are individually heated preferably to a temperature of from about 60° C. to about 135° C. and then the polyester and chain extender are substantially simultaneously mixed with the diisocyanate. In a preferred embodiment, the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to about 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516, 2,621,166 and 2,729,618. The reaction mixture, after complete mixing, is conducted onto a suitable heated surface or poured onto a table or conveyor and preferably maintained at a temperature of from about 60° C. to about 135° C. until it solidifies, e.g., into a slab so that it is still a thermoplastic and can be easily removed and reduced to the desire particle size. To facilitate the ready removal of the material from the hot plate, the table, conveyor or other surface, the slab or other physical form may be cut or scored while it is still soft to permit removal in a number of pieces rather than a unit. This cutting or scoring is best done while the reaction mixture is still soft, for when the material hardens it becomes difficult to cut although it can still be readily reduced in size by grinders, choppers and other equipment known in the industry.

After the reaction mixture has reacted to form a hard product which is suitable for cutting, chopping or grinding, it is cooled to room temperature. This material may then be either stored for several weeks, if desired, or it may be immediately blended with the acetal polymer and the multiphase composite interpolymer to form the compositions of the invention. Most preferably, the polyurethanes useful in the present invention have Shore hardnesses (ASTM D2240) between about 70 on the "A" scale and 60 on the "D" scale.

If desired, the thermoplastic polyurethane of the present invention can have incorporated in it, at any appropriate stage of preparation, and before blending with the acetal polymer or the multiphase, composite interpolymer additives such as pigments, fillers, lubricants, stabilizers, antioxidants, coloring agents, fire retardants, and the like, which are commonly used in conjunction with polyurethane elastomers.

The multiphase composite interpolymer comprises about 25 to 95 weight percent of a first elastomeric phase and about 75 to 5 weight percent of a final rigid thermoplastic phase. One or more intermediate phases are optional, e.g., a middle stage polymerized from about 75 to 100 percent by weight of styrene may be incorporated.

Various crosslinked, elastomeric polymers may be used as the first stage of the multiphase composite interpolymer. One suitable first stage polymer is an acrylic rubber core having a $T_g$ below about 10° C. and prepared by polymerizing a monomeric composition comprising about 75 to 99.8 weight percent of a $C_1$ to $C_6$ alkyl acrylate, 0.1 to 5 weight percent of a crosslinking monomer and 0.1 to 5 weight percent of a graftlinking monomer. The preferred alkyl acrylate for this class of polymers is butyl acrylate.

The crosslinking monomer is a polyethylenically unsaturated monomer having a plurality of addition polymerizable reactive groups, all of which polymerize at substantially the same rate of reaction. Suitable crosslinking monomers include polyacrylic and methacrylic esters of polyols such as butylene diacrylate and butylene dimethacrylate, trimethylolpropane trmethacrylate, and the like; di- and trivinyl benzene, vinyl acrylate and methacrylate and the like. The preferred crosslinking monomer is butylene diacrylate.

The graftlinking monomer is a polyethylenically unsaturated monomer having a plurality of addition polymerizable reactive groups, at least one of the reactive groups polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomeric particles. When the rigid thermoplastic phase is subsequently polymerized at the surface of the elastomer, the residual unsaturated addition polymerizable reactive groups contributed by the graftlinking monomer participate in the subsequent reaction so that at least a portion of the rigid phase is chemically attached to the surface of the elastomer. Among the effective graftlinking monomers are allyl groups containing monomers such as allyl esters of ethylenically unsaturated acids, e.g. allyl acrylate, allyl acid maleate, allyl acid fumarate and allyl acid itaconate. Somewhat less preferred are the diallyl esters of polycarboxylic acids which do not contain polymerizable unsaturation. The preferred graftlinking monomers are allyl methacrylate and diallyl maleate.

Another suitable class of first stage polymers is the "MBS" polymers, made by polymerizing a monomeric mixture comprising, for example, about 50 to 85 weight percent of butadiene, about 5 to 25 weight percent of styrene and about 10 to 30 weight percent of methyl methacrylate. Due to the nature of butadiene polymerization, these polymers contain residual unsaturation which makes them susceptible to being lightly crosslinked in accordance with techniques well-known in the art, in order to obtain and maintain elasticity. Even after crosslinking, these polymers still contain some unsaturation which enables them to be graftlinked to the final rigid thermoplastic phase, as described previously.

The final stage can be polymerized from a monomer system comprising $C_1$ to $C_{16}$ alkyl methacrylates, styrene, acrylonitrile, alkyl acrylates, allyl methacrylate, diallyl methacrylate, and the like, as long as the overall $T_g$ is at least 20° C. Preferably the final stage monomer system is at least 50 weight percent of a $C_1$ to $C_4$ alkyl acrylate. It is further preferred that the final stage polymer be free of moieties which tend to degrade polyoxymethylenes, for example, an acid moiety.

A most preferred interpolymer has only two stages. The first stage, about 60 to 95 weight percent of the interpolymer, is polymerized from a monomer system comprising 95 to 99.8 weight percent butyl acrylate, 0.1 to 2.5 weight percent butylene diacrylate as the crosslinking agent and 0.1 to 2.5 weight percent allyl methacrylate or diallyl maleate as the graftlinking monomer. The final stage of the interpolymer is polymerized from about 5 to 40 weight percent methyl methacrylate. The most preferred multiphase composite interpolymer is of this type and is commercially available from Rohm and Haas and is designated as Acryloid KM-330.

The thermoplastic polyurethane and multiphase composite interpolymer is intimately blended with the acetal polymer by any convenient technique known to those skilled in the art which is capable of producing a substantially uniform dispersion of the particles throughout the polymer matrix. Preferably, in the blending or compounding process the shear rate employed should be below 5000 sec.$^{-1}$. In a preferred technique, the compounding is accomplished by the use of a Johnson 2½" single screw extruder at approximately 190° to 200° C. The range of shear rate of this extruder is approximately 0-3000 sec.$^{-1}$. It has been found that high shear mixing is detrimental in the process since the spherical particle structure of the multiphase interpolymer can be destroyed and the desired impact modification and processability not achieved.

The amount of thermoplastic polyurethane and multiphase composite interpolymer in the final molding composition can be varied widely so long as they are lower in amount than the acetal polymer. For example the compositions may comprise about 60 to 95, preferably about 70 to 90 weight percent of the acetal polymer, about 4 to 30, preferably about 5 to 20 weight percent of the thermoplastic polyurethane, and about 1 to 10, preferably about 5 to 10 weight percent of the multiphase composite interpolymer, all of the foregoing weight percents being based on the weight of the total composition.

The compositions of this invention may be used in all molding applications known to be suitable for acetal polymers. However, they are particularly useful in applications for which high impact strength is particularly important, e.g. exterior automobile parts such as bumper extensions, machine parts, such as gears having frequent contact with other parts, tool casings, and the like.

The following examples further illustrate the invention.

CONTROL EXAMPLE A

This example illustrates the impact strength of a typical acetal polymer not containing any additive for the enhancement of its impact strength.

The acetal polymer as a trioxane-ethylene oxide copolymer containing about 98 weight percent of recurring —$OCH_2$— groups and about 2 weight percent of comonomer units derived from ethylene oxide having the formula —$OCH_2CH_2$—. It was prepared as previously described herein and more specifically in the aforementioned U.S. Pat. No. 3,027,352 to Walling et al, and was hydrolyzed to stabilize the ends of the polymer chains. The acetal polymer possessed a crystallinity of approximately 75 percent, a number average molecular weight of approximately 35,000, an inherent viscosity (I.V.) of approximately 1.3 (measured at 60° C. in a 0.1 weight percent solution in p-chlorophenol containing 2 weight percent of alphapinene), a melting temperature of 165° C., and a melt index of approximately 2.5 g/10 min. when tested in accordance with ASTM method D1238-82.

The acetal polymer also contained, as a stabilizer package, 0.5 percent by weight of 1,6-hexamethylene bis-(3',5'-di-t-butyl-4'-hydroxyhydrocinnamate) as antioxidant, sold by Ciba-Geigy Corp. under the trademark "Irganox 259," 0.1 percent by weight cyanoguanidine as a thermal stabilizer, and 0.2 percent by weight of N,N'-ethylene bisstearamide as mold lubricant sold by Glycol Chemical, Inc. under the trademark "Acrawax C." This acetal polymer composition is available from Celanese Corporation under the trademark "Celcon M25-04."

The acetal polymer composition was formed into a 2×⅛ inch disc using an eight ounce Reed injection molding machine operating at a temperature profile of 390° F. across, a nozzle temperature of 395° F., and an injection pressure of 10,000-13,000 psig. The disc was found to have a Gardner Impact strength of 12 in. lb. using the standard Gardner Impact test.

CONTROL EXAMPLE B

This example illustrates the effect on impact strength of adding a standard amount of a themoplastic polyurethane to the acetal polymer composition of Control Example A.

The acetal polymer used was the composition of Control Example A and the thermoplastic polyurethane was a polyether-based polyurethane prepared by reacting 1.0 equivalent of polyoxytetramethylene glycol having a molecular weight of about 2000 with 1.5 equivalents of 1,4-butanediol and 2.63 equivalents of 4,4'-methylenebis(phenyl isocyanate) admixed with 0.25 percent by weight of N,N'-ethylene bisstearamide (lubricant) sold under the trademark "Advawax 280," by Cincinnati Milacron Chemical, Inc., and 0.25 percent by weight of tetrakis[methylene 3-(3',5'-di-tert-butyl-4'-hydroxyphenyl)propionate]methane (antioxidant) sold under the trademark "Irganox 1010," by Ciba-Geigy Corp. The weight percent of the additives are based on the total weight of the polyurethane reactants. An example of such a polyurethane composition is sold by Upjohn Company under the trademark "Pellethane X0157-75A."

A dry mix of the acetal polymer composition and the polyurethane composition was formed containing 10 weight percent of the polyurethane based on the weight of the total composition. The mix was melt blended in a 2½" Johnson single screw extruder, using a speed of 60

RPM and a vacuum of 29 inches of Hg, and a 2×⅛ inch disc was formed following the procedure of Control Example A. The composition had a Gardner Impact strength of 120 in. lb.

CONTROL EXAMPLE C

This example illustrates the effect on impact strength of adding a standard amount of a multiphase composite interpolymer to the acetal polymer composition of Control Example A.

The acetal polymer used was the composition of Control Example A. The multiphase composite interpolymer was produced in accordance with U.S. Pat. No. 4,096,202 and was obtained from the Rohm and Haas Company under the trademark "Acryloid KM-330", with particle sizes in the range of 10 to 100 microns.

The procedure of Control Example B was followed except that the composition contained 10 weight percent of the multiphase composite interpolymer based on the weight of the total composition instead of the polyurethane. The composition was found to have a Gardner Impact strength of 120 in. lb.

EXAMPLE 1

This example illustrates a composition within the invention showing the unexpected improvement in impact strength obtained by the addition of both thermoplastic polyurethane and multiphase composite interpolymer as compared with the improvements obtained by the addition of each of the additives alone in an amount equal to the total of the two additives under the invention.

The procedure of Control Examples B and C was followed except that the composition was prepared by blending 50 weight percent of the composition of Control Example B and 50 weight percent of Control Example C so that the final composition contained 90 weight percent of the acetal polymer composition described in Control Example A, 5 weight percent of the thermoplastic polyurethane described in Control Example B and 5 weight percent of the multiphase composite interpolymer described in Control Example C. The composition was found to have a Gardner Impact strength of 144.

Comparing the results of Example 1 with those of Control Examples A, B, and C, it can be seen that while the use of the described thermoplastic polyurethane or multiphase composite interpolymer each causes a substantial improvement in the impact strength of an acetal polymer, the use of both additives in total amount equal to the amount of each additive when used separately (in this case, 10 weight percent of the total composition) results in an even greater improvement.

CONTROL EXAMPLE D

This example illustrates the impact strength of another acetal polymer not containing any additives for impact strength enhancement.

The acetal polymer was a moldable ethylene oxide/trioxane/butanediol diglycidyl ether terpolymer containing about 2.0 weight percent, 97.95 weight percent and 0.05 weight percent of each component respectively, hydrolyzed using methods known in the art to remove its unstable end groups, and containing 0.5 weight percent of "Irganox 259" as anti-oxidant and 0.1 weight percent of cyanoguanidine as thermal stabilizer.

Following the procedure of Control Example A the polymer composition was found to have a Gardner Impact strength of 30 in. lb.

CONTROL EXAMPLE E

This example illustrates the effect on impact strength of adding a standard amount of a thermoplastic polyurethane to the acetal polymer composition of Control Example D.

The procedure of Control Example B was followed using the same polyurethane and the acetal polymer composition of Control Example D. The Gardner Impact strength of the composition was 30 in. lb.

CONTROL EXAMPLE F

This example illustrates the effect on impact strength of adding a standard amount of a multiphase composite interpolymer to the acetal polymer composition of Control Example D.

The procedure of Control Example C was followed using the same multiphase composite interpolymer and the acetal polymer composition of Control Example D. The Gardner Impact strength of the composition was 30 in. lb.

EXAMPLE 2

This example illustrates a composition under the invention containing the acetal polymer of control Example D and shows the effect of the impact strength of this polymer of adding both a thermoplastic polyurethane and a multiphase composite interpolymer as compared to that of adding each of these additive polymers alone.

The procedure of Example 1 was followed using 50 weight percent of the composition of Control Example E and 50 weight percent of Control Example F, so that the final composition contained 5 weight percent each of the thermoplastic polyurethane and the multiphase composite interpolymer. The Gardner Impact strength of this composition was 90 in. lb.

A comparison of the results of Example 2 with those of Control Examples D, E and F shows that while the addition of the polyurethane and the multiphase composite interpolymer each yielded a threefold increase in the impact strength of the unmodified acetal polymer composition of Control Example D, use of both of these additives such that the total amount of additives intended to enhance the impact strength of the acetal polymer remained the same, unexpectedly caused a further threefold increase in the higher impact strength resulting from the use of the individual additives alone.

Similar results are obtained when the polyether-based polyurethane of Examples 1 and 2 is replaced by a polyester-based polyurethane available from Mobay Chemical Corporation under the trademark "Texin 591 AR" and obtained by reacting a poly(ethylene, tetramethylene adipate) with 4,4'-methylenebis(phenyl isocyanate) and 1,4-butanediol as chain extending agent.

In addition to improved impact performance, the compositions of this invention also have superior weld line strength, U.V. and chemical resistance, and processability.

We claim:

1. A composition having improved impact strength comprising about 60 to 95 weight percent of an acetal polymer selected from the group consisting of oxymethylene homopolymers and oxymethylene copolymers containing carbon-to-carbon bonds in the polymer chain, about 4 to 30 weight percent of a substantially linear thermoplastic polyurethane, and about 1 to 10 weight percent of a multiphase composite interpolymer comprising a first elastomeric stage and a final rigid thermoplastic stage, said weight percents being based on the weight of the total composition.

2. The composition of claim 1 wherein said polyurethane is the reaction product of:
   (i) 4,4'-methylenebis(phenyl isocyanate),
   (ii) polyoxytetramethylene glycol having a molecular weight within the range of about 1500 to about 3000, and
   (iii) at least one diol extender selected from the group consisting of aliphatic straight chain diols having from 2 to about 6 carbon atoms, bis(2-hydroxyethyl)ether of hydroquinone, and bis(2-hydroxyethyl)ether of resorcinol,
   said diol extender being used in the reaction within the amount of about 0.5 to about 2.5 equivalents of extender per equivalent of said polyoxytetramethylene glycol, and said phenyl isocyanate being used in the reaction in an amount such that the ratio of isocyanate groups to total hydroxyl groups is within the range of about 1.0:1.0 to about 1.08:1.0.

3. The composition of claim 1 wherein said multiphase composite interpolymer comprises
   (A) about 25 to 95 weight percent of first elastomeric phase polymerized from a monomer system comprising about 75 to 99.8% by weight $C_1$ to $C_6$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and,
   (B) about 75 to 5 weight percent of a final, rigid thermoplastic phase polymerized in the presence of said elastomeric phrase.

4. The composition of claim 2 wherein said multiphase composite interpolymer comprises
   (A) about 25 to 95 weight percent of first elastomeric phase polymerized from a monomer system comprising about 75 to 99.8% by weight $C_1$ to $C_6$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
   (B) about 75 to 5 weight percent of a final, rigid thermoplastic phase polymerized in the presence of said elastomeric phrase,
   said weight percents being based on the weight of the multiphase composite interpolymer.

5. The composition of claim 4 wherein said polyurethane is present in an amount of about 5 to 20 weight percent and said multiphase composite interpolymer is present in an amount of about 5 to 10 weight percent, based on the weight of the total composition.

6. The composition of claim 2 wherein said diol chain extender is 1,4-butanediol.

7. The composition of claim 3 wherein said multiphase composite interpolymer has only two stages, the first stage comprising about 60 to 95% by weight of said interpolymer and said first stage is polymerized from a monomer system comprising 95 to 99.8% by weight butyl acrylate, 0.1 to 2.5% by weight butylene diacrylate as a crosslinking agent, 0.1 to 2.5% by weight allyl methacrylate or diallyl maleate as a graftlinking agent, and said final stage is polymerized from about 60 to 100% by weight methyl methacrylate.

8. A method of improving the impact strength of an acetal polymer which comprises componding with about 60 to 95 weight percent of said acetal polymer at a shear rate of less than about 5000 $sec^{-1}$, about 4 to 30 weight percent of a substantially linear thermoplastic polyurethane, and about 1 to 10 weight percent of a multiphase composite interpolymer comprising a first elastomeric stage and a final rigid thermoplastic stage, said weight percents being based on the weight of the total composition.

9. The method of claim 8 wherein said polyurethane is the reaction product of
   (i) 4,4'-methylenebis(phenyl isocyanate),
   (ii) polyoxytetramethylene glycol having a molecular weight within the range of about 1500 to about 3000, and
   (iii) at least one diol extender selected from the group consisting of aliphatic straight chain diols having from 2 to about 6 carbon atoms, bis(2-hydroxyethyl)ether of hydroquinone, and bis(2-hydroxyethyl)ether of resorcinol.

10. The method of claim 8 wherein said multiphase composite interpolymer comprises
    (A) about 25 to 95 weight percent of first elastomeric phase polymerized from a monomer system comprising about 75 to 99.8% by weight $C_1$ to $C_6$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and,
    (B) about 75 to 5 weight percent of a final, rigid thermoplastic phase polymerized in the presence of said elastomeric phrase.

11. The composition of claim 1 wherein said acetal polymer is a copolymer of trioxane and 0.1 to 15 mole percent of a cyclic ether having at least two adjacent carbon atoms.

12. The composition of claim 11 wherein said cyclic ether is dioxolane or ethylene oxide.

13. The composition of claim 1 wherein said acetal polymer is a formaldehyde homopolymer.

* * * * *